(12) United States Patent
Radovanovic et al.

(10) Patent No.: US 11,960,255 B2
(45) Date of Patent: *Apr. 16, 2024

(54) COMPUTE LOAD SHAPING USING VIRTUAL CAPACITY AND PREFERENTIAL LOCATION REAL TIME SCHEDULING

(71) Applicant: Google LLC, Mountain View, CA (US)

(72) Inventors: Ana Radovanovic, New York, NY (US); Alexandre Nobrega Duarte, San Jose, CA (US); Binayak Roy, Santa Clara, CA (US); Diyue Xiao, Sunnyvale, CA (US); Walfredo da Costa Cirne Filho, Mountain View, CA (US); Maya Haridasan, San Jose, CA (US); Ross Koningstein, Atherton, CA (US); Eric Alexander Mullen, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,041

(22) Filed: Mar. 31, 2023

(65) Prior Publication Data

US 2023/0288887 A1 Sep. 14, 2023

Related U.S. Application Data

(63) Continuation of application No. 17/644,478, filed on Dec. 15, 2021, now Pat. No. 11,644,804, which is a
(Continued)

(51) Int. Cl.
| | | |
|---|---|---|
| *G05B 13/04* | (2006.01) | |
| *G05B 13/02* | (2006.01) | |
| *H02J 3/00* | (2006.01) | |

(52) U.S. Cl.
CPC ....... *G05B 13/048* (2013.01); *G05B 13/0265* (2013.01); *H02J 3/00* (2013.01); *H02J 3/003* (2020.01); *H02J 2203/20* (2020.01)

(58) Field of Classification Search
CPC ..... G05B 13/048; G05B 13/0265; H02J 3/00; H02J 3/003; H02J 2203/20
See application file for complete search history.

(56) References Cited

U.S. PATENT DOCUMENTS

| | | |
|---|---|---|
| 8,589,931 B2 | 11/2013 | Barsness et al. |
| 8,683,479 B1 | 3/2014 | Arlitt et al. |
| (Continued) | | |

FOREIGN PATENT DOCUMENTS

| | | |
|---|---|---|
| CN | 102369486 | 3/2012 |
| CN | 103377084 | 10/2013 |
| (Continued) | | |

OTHER PUBLICATIONS

Amokrane et al., "Greenslater: On Satisfying Green SLAs in Distributed Clouds" IEEE Transactions on Network and Service Management, Sep. 2015, 14 pages.
(Continued)

*Primary Examiner* — Gary Collins
(74) *Attorney, Agent, or Firm* — Fish & Richardson P.C.

(57) ABSTRACT

Methods, systems, and apparatus, including computer programs encoded on a computer storage medium, for shaping compute load using virtual capacity. In one aspect, a method includes obtaining a load forecast that indicates forecasted future compute load for a cell, obtaining a power model that models a relationship between power usage and computational usage for the cell, obtaining a carbon intensity forecast that indicates a forecast of carbon intensity for a geographic area where the cell is located, determining a virtual capacity for the cell based on the load forecast, the power model, and
(Continued)

the carbon intensity forecast, and providing the virtual capacity for the cell to the cell.

13 Claims, 5 Drawing Sheets

Related U.S. Application Data continuation of application No. 16/684,013, filed on Nov. 14, 2019, now Pat. No. 11,221,595.

(56) References Cited

U.S. PATENT DOCUMENTS

| | | |
|---|---|---|
| 9,218,035 B2 | 12/2015 | Li et al. |
| 9,654,414 B2 | 5/2017 | Chatterjee et al. |
| 11,221,595 B2 * | 1/2022 | Radovanovic ............ H02J 3/00 |
| 2009/0281846 A1 | 11/2009 | Rose |
| 2010/0053925 A1 | 3/2010 | Huang |
| 2010/0191998 A1 | 7/2010 | Moore |
| 2011/0071867 A1 | 3/2011 | Chen et al. |
| 2011/0282982 A1 | 11/2011 | Jain |
| 2012/0053925 A1 | 3/2012 | Geffin et al. |
| 2012/0109705 A1 * | 5/2012 | Belady .................. G06F 9/5094 |
| | | 705/37 |
| 2012/0166005 A1 | 6/2012 | Mayhew |
| 2012/0185105 A1 | 7/2012 | McMullin |
| 2012/0226922 A1 | 9/2012 | Wang et al. |
| 2012/0240113 A1 | 9/2012 | Hur |
| 2013/0116803 A1 | 5/2013 | Gmach et al. |
| 2014/0298349 A1 | 10/2014 | Jackson |
| 2015/0017008 A1 | 1/2015 | Ramachandran et al. |
| 2015/0227397 A1 | 8/2015 | Gogula et al. |
| 2015/0278968 A1 | 10/2015 | Steven et al. |

FOREIGN PATENT DOCUMENTS

| | | |
|---|---|---|
| CN | 103959190 | 7/2014 |
| CN | 105302632 | 2/2016 |
| CN | 107623733 | 1/2018 |
| CN | 108845881 | 11/2018 |
| CN | 108898282 | 11/2018 |
| CN | 110073301 | 7/2019 |
| CN | 110276485 | 9/2019 |

OTHER PUBLICATIONS

European Search Report in European Appln. No. 20191680.6, dated Nov. 2, 2020, 9 pages.

Dong et al., "Research Status and Trends of Virtual Power Plants Under Electrical Internet of Things" Advanced Engineering Sciences vol. 52, vol. 4, Jul. 3-12, 2020, (with English abstract).

Notice of Allowance in Chinese Appln. No. 202011031517.9, dated Oct. 31, 2023, 8 pages (with English translation).

Wei et al., "Virtual Machine Migration Algorithm to Reduce Energy Consumption in Datacenter" Computer and Digital Engineering, vol. 46, No. 1, 2018, 4 pages (with English abstract).

* cited by examiner

COMPUTE LOAD SHAPING USING VIRTUAL CAPACITY AND PREFERENTIAL LOCATION REAL TIME SCHEDULING

CROSS-REFERENCE TO RELATED APPLICATION

This application is a continuation of U.S. application Ser. No. 17/644,478, filed on Dec. 15, 2021, which is a continuation of U.S. application Ser. No. 16/684,013, filed on Nov. 14, 2019, the contents of which are incorporated by reference herein.

FIELD

This specification relates to management of compute load.

BACKGROUND

Computing systems may handle various computations. However, computations performed by the computing systems require power, and generation of the power may result in carbon emissions. The power usage from computations performed in some cases may also cause undesirable expense, e.g., demand charges, varying rates over time, or special circumstances such as mandated power reductions.

SUMMARY

Compute loads of computing systems may result in carbon emissions that harm the environment. For example, a computing system that is computing at a 75% capacity generally uses more power than when the computing system is computing at 25% capacity load. A compute load may refer to computations performed by computing systems.

The amount of carbon emissions generated to provide power used by computing systems may vary across time. For example, power for a computing system and other electrical systems in a geographic area may be available from both wind power and coal power, but if the wind power is insufficient to provide power for the computing system and the other electrical systems during a particular hour, then more power may need to be produced using coal during that hour resulting in net additional carbon emissions.

Generally, there is greater electric power demand during daylight hours and less demand during night time hours. For example, during night time hours more people are asleep and less power is used for lighting and air conditioning purposes. Consider the example where the additional power generation needed during the day is provided by a fossil-fuel source: then, power used during the daylight hours results in more carbon emissions than power used during the night time. Forecasted power usage may be used to predict the difference in carbon emissions of compute loads for computing systems depending on time of day.

A system may shape a compute load for a computing system so that jobs that are not time sensitive may be executed when the amount of carbon emissions generated to provide power used by the computing systems is lower than other times. For example, jobs that are not time sensitive might be executed at night. A job may be identified by a single process and may be a unit of work or unit of execution.

In addition to flexibility of compute load across time, there is also flexibility in where compute load can be run. So if a load is spatially flexible, and given sufficient available capacity in a data center where the carbon dioxide emissions are less for that load, it can be desirable to recommend that that load run at that data center.

The cost of consumption of electricity may also vary over the course of a day or between different locations. This can be a function of electricity pricing that varies by time of day. It could be due to mandated capacity reductions from the utility. Electricity consumption limits may also need to be managed, for example, in the event that it is possible for compute load to momentarily exceed the ratings of circuits or electricity feeds into a data center.

Thus, there are a combination of desirable goals such as reducing carbon dioxide emissions and electricity cost, as well as hard limits such as power caps for utility demand reduction and/or staying within acceptable operating bounds. When working with a highly dynamic set of compute jobs that may or may not have spatial or time flexibility, where full advance planning and allocation is not a viable strategy, one mechanism is instituting hard compute capacity and/or keeping power constraints at particular data center locations flexible.

The system may shape the compute load through determining a virtual capacity for cells and then having the cells determine when to execute jobs based on the virtual capacity. Cells may refer to one or more physical computing systems located in a geographic area. A cell may be a lowest level compute system at which compute load placement is managed. A virtual capacity for a cell may refer to a capacity of a cell that is virtual. For example, the virtual capacity of a cell may be set to be half that of an actual capacity of the cell to half the maximum amount of resource usage by the cell, and thus potentially reduce the amount of carbon generated to power the cell.

Use of the virtual capacity may enable the infrastructure for distribution of jobs between cells and execution of jobs on the cells to remain mostly unchanged in that the system may not need to determine in advance the exact time of day and location where a job will be executed. For example, the jobs may not need to be scheduled in advance for particular times and each cell may instead determine whether to execute a job based on whether a difference between the virtual capacity for cell A 150A at that time and resource usage by the cell is sufficient to execute the job.

Based on the above, the system may provide for real time carbon-based and cost-based shaping of compute load. Accordingly, the system may reduce carbon emissions while supporting the same total amount of computations. The system may also reduce peak power demand needed for cells, which may also reduce costs needed for infrastructure to enable the peak power usage. For example, less peak power demand may result in less cooling needed.

In general, one innovative aspect of the subject matter described in this specification can be embodied in methods that include the actions of obtaining a load forecast that indicates forecasted future compute load for a cell, obtaining a power model that models a relationship between power usage and computational usage for the cell, obtaining a carbon intensity forecast that indicates a forecast of carbon intensity for a geographic area where the cell is located, determining a virtual capacity for the cell based on the load forecast, the power model, and the carbon intensity forecast, and providing the virtual capacity for the cell to the cell.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In certain aspects, determining a virtual capacity for the cell based on the load forecast, the power model, and the carbon intensity forecast includes obtaining respective load forecasts that indicate forecasted future compute loads for respective multiple other cells, obtaining respective power models that model relationships between power usage and computational usage for the respective other cells, obtaining respective carbon intensity forecasts that indicate forecasts of carbon intensity for geographic areas where the respective other cells are located, and determining both the virtual capacity for the cell and respective virtual capacities for the other cells based on the load forecast, the power model, the carbon intensity forecast, the respective load forecasts, the respective power models, and the respective carbon intensity forecasts.

In some aspects, actions include receiving an indication of a total amount of spatially and temporally flexible demand, where determining both the virtual capacity for the cell and respective virtual capacities for the other cells is further based on the total amount of spatially and temporally flexible demand. In some implementations, actions include receiving an indication of a total amount of spatially and temporally flexible demand, where a preference for deciding in which cell a job runs is determined to aid real-time load scheduling. In certain aspects, the virtual capacity indicates a maximum computational capacity for the cell for predetermined time intervals.

In some implementations, the virtual capacity indicates a maximum computational capacity for the cell for each hour in a day. In certain aspects, the cell is configured to perform operations of receiving a job, determining an amount of computational resources needed to execute the job, determining that a difference between the virtual capacity for the cell and a current computational usage of the cell satisfies the amount of computational resources needed to execute the job, and executing the job. In some aspects, the cell is configured to perform operations of receiving a job, determining an amount of computational resources needed to execute the job, determining that a difference between the virtual capacity for the cell and a current computational usage of the cell does not satisfy the amount of computational resources needed to execute the job, and deferring execution of the job.

In some implementations, determining a virtual capacity for cell Based on the load forecast, the power model, and the carbon intensity forecast includes determining, based on the load forecast, the power model, and the carbon intensity forecast, the virtual capacity such that the virtual capacity reduces load peaks in the cell and reduces carbon footprint from power usage by the cell. In certain aspects, obtaining a power model that models a relationship between power usage and computational usage for the cell includes training the model based on historical power usage of the cell and historical computational capacity of the cell that is used. In some aspects, obtaining a load forecast that indicates forecasted future compute load for a cell includes determining a portion of the load forecast that is not time flexible, wherein determining the virtual capacity for the cell includes determining the virtual capacity to be greater than the portion of the load forecast that is not time flexible.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
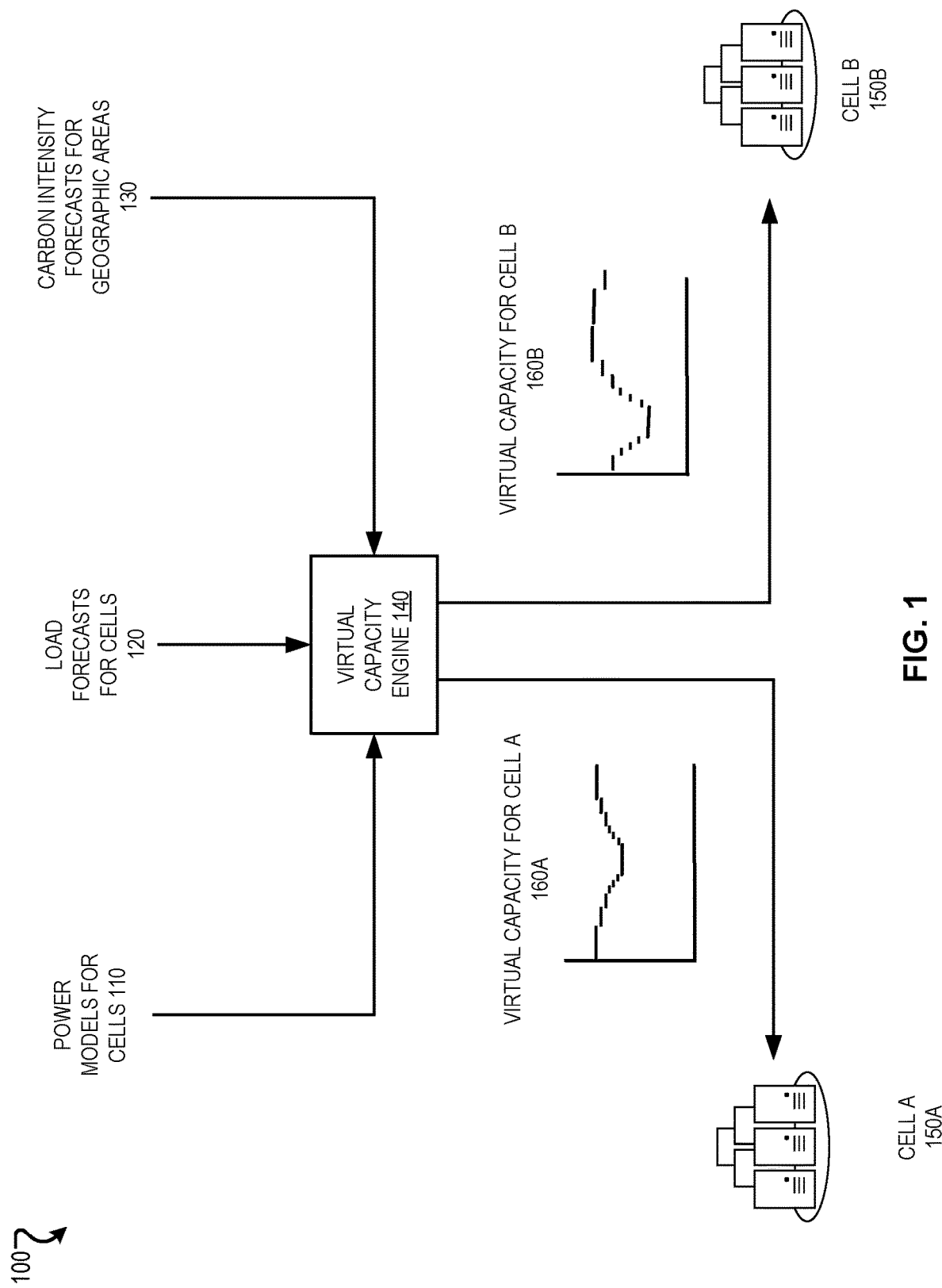
FIG. 1 is a block diagram that illustrates an example system that uses virtual capacity to shape compute loads.

FIG. 1 is a block diagram that illustrates an example system 100 that uses virtual capacity to shape compute loads. Briefly, and as will be described below in more detail, the system 100 includes a virtual capacity engine 140 and cells 150A and 150B (hereinafter collectively referred to as 150).

The virtual capacity engine 140 is one or more computing devices that receives power models 110 for the cells 150, load forecasts 120 for the cells 150, carbon intensity forecasts for geographic areas 130, and determines virtual capacities 160A and 160B (hereinafter collectively referred to as 160) for the cells 150. The cells 150 are each one or more computing devices that execute jobs. While the system 100 is shown with two cells 150, other systems may include three, five, twenty, or some other number of cells.

A power model for a cell may be a model of a relationship between power usage and computational usage for the cell. For example, the power model for cell A 150A may model how the power usage of cell A 150A increases as an amount of computational capacity of cell A 150A that is used increases. A load forecast for a cell may indicate a forecasted future compute load for a cell. For example, the load forecast for cell A 150A may indicate an amount of forecasted compute load that is time sensitive for each hour of the next day and an amount of forecasted compute load that is not time sensitive for the next day. A carbon intensity forecast for a cell may indicate a forecast of carbon intensity for a geographic area that the cells is located. For example, the carbon intensity forecast for cell A 150A may indicate a forecasted amount of average carbon intensity for each hour of the next day.

The virtual capacity engine 140 may receive power models 110 for each of the cells 150. For example, the virtual capacity engine 140 may receive a first power model for cell A 150A and a second, different power model for cell B 150B. The virtual capacity engine 140 may receive the power models 110 for the cells from a power model engine.

The power model engine may monitor historical power usage of each cell A 150A and historical resource usage of the cell, and determine the relationship between the power usage and resource usage for each cell based on the historical power usage and the historical resource usage of the cell.

The power model for each cell may be determined daily based on historical power usage and historical resource usage for the day before, three days before, or some other period of time. In some implementations, the power model engine may be incorporated in the virtual capacity engine 140 so that the virtual capacity engine 140 also performs functions described above for the power model engine.

Figure 2A:
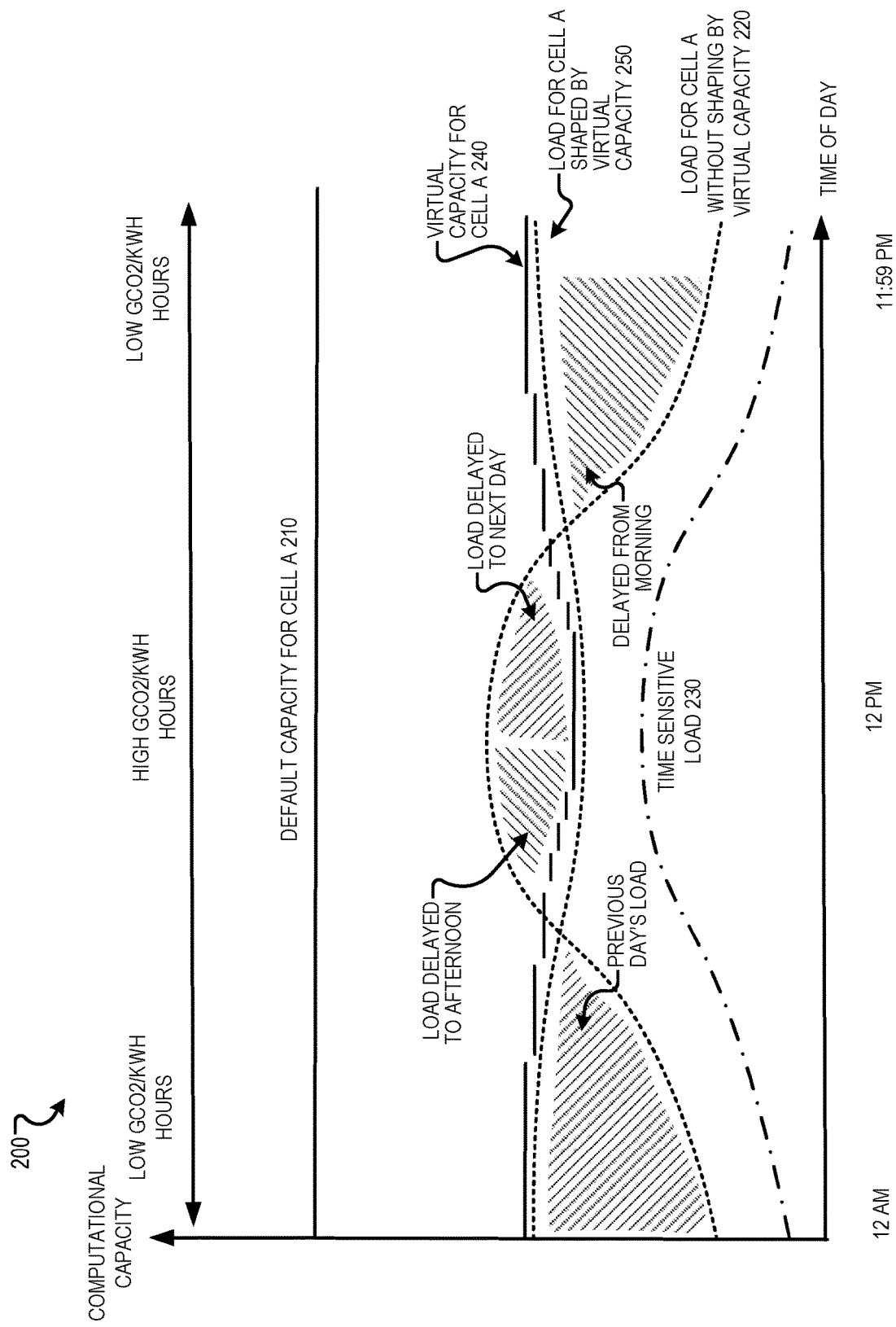
FIG. 2A is an example graph that shows a compute load shaped by virtual capacity.

The virtual capacity engine 140 may receive load forecasts 120 for the cells 150. For example, the virtual capacity engine 140 may receive a curve that represents a forecasted time sensitive load 230 for cell A 150A for a next day as shown in FIG. 2A and a forecasted total amount of load for cell A 150A for the next day, and similarly receive another curve that represents a forecasted time sensitive load for cell B and forecasted total amount of load for cell B.

The virtual capacity engine 140 receives carbon intensity forecasts for geographic areas 130. For example, the virtual capacity engine 140 may receive a first carbon intensity forecast for cell A 150A that is located in Europe and a second, different carbon intensity forecast for cell B that is located in Asia.

The virtual capacity engine 140 may determine virtual capacities 160 for each of the cells 150 based on the power models 110 for the cells 150, load forecasts 120 for the cells 120, carbon intensity forecasts for geographic areas 130. The virtual capacity engine 140 may determine the virtual capacity for cells based on other additional factors such as capacity constraints, contractual constraints, or throughput conservation constraint.

For example, the virtual capacity engine 140 may determine the virtual capacity 160A for cell A 150A that provides higher capacity around 0:00 Greenwich Mean Time (GMT) and lower capacity around 12:00 GMT based on that the carbon intensity forecast for where cell A 150A is located shows more carbon intensity around 12:00 GMT and less carbon intensity around 0:00 GMT.

In another example, the virtual capacity engine 140 may determine the virtual capacity 160B for cell B that provides higher capacity around 18:00 GMT based on that the carbon intensity forecast for where cell B 150B is located shows more carbon intensity around 18:00 GMT and less carbon intensity around 6:00 GMT. Additionally, the virtual capacity 160B for cell B may have a greater variation than the virtual capacity for cell A 150A as the load forecasts may indicate less forecasted load for cell B for the next day than for cell A 150A.

The virtual capacity engine 140 may provide the virtual capacities 160 to the respective cells 150. For example, the virtual capacity engine 140 may provide virtual capacity 160A to cell A 150A without providing virtual capacity 160B to cell A 150A, and provide virtual capacity 160B to cell B 150B without providing virtual capacity 160A to cell B 150B.

Each of the cells 150 may then execute jobs on the cell based on the virtual capacities 160 for the cell. Each time a cell of the cells 150 receives a job, the cell may determine an amount of computational capacity needed to execute the job, the amount of computational capacity available at the cell based on the virtual capacity indicated at the time that the job is received, and determine whether the amount of computational capacity available at the cell satisfies the amount of compute load needed to execute the job.

In response to determining satisfaction, the cell may begin execution of the job. In response to determining non-satisfaction, the cell may place the job at the end of a queue of jobs, where the queue of jobs operates in a first in and first out manner and the oldest job in the queue begins execution once the cell determines that computational capacity available at the cell based on the virtual capacity indicated at a current time satisfies the amount of compute load needed to execute the oldest job.

In some implementations, the system 100 may be spatially flexible and the virtual capacity engine 140 may obtain geo-location load preferences and determine the virtual capacity for cells further based on the geo-location load preferences. Geo-location load preferences may include an amount of demand that is flexible for cells. In some implementations, the virtual capacity engine 140 may receive an indication of a total amount of spatially and temporally flexible demand at different levels of hierarchy in the system 100 and then determine virtual capacities for cells based on the spatially and temporally flexible demand. For example, the virtual capacity engine 140 may receive an indication of an amount of compute load at each time that is flexible in the location that the compute load is computed. The virtual capacity engine 140 may increase virtual capacity at cells where flexible demand may preferably be computed. The system 100 may favor routing jobs to cells that have more available capacity, so more flexible demand may be routed to cells in which virtual capacity are enlarged. Accordingly, the virtual capacity engine 140 may determine virtual capacity for all cells globally to optimize reduction of carbon emissions and/or decrease electricity costs.

FIG. 2A is an example graph 200 that shows a compute load shaped by virtual capacity. The graph 200 is represented with time from 12 AM (also referred to as 0:00) to 11:59 PM (also referred to as 23:59) along the horizontal axis and increasing computational capacity along the vertical axis. The graph 200 shows how grams of carbon dioxide ($gCO_2$) emitted per kilowatt (kWh) is low around midnight and high around 12 PM. A first line 210 in the graph 200 shows how the default capacity for cell A 150A is higher than computational capacity needed at any time.

A first curve 220 represents the load for cell A 150A without shaping by virtual capacity. The first curve 220 shows that the compute load of cell A 150A is high when $gCO_2$/kWh is high and is low when $gCO2$/kWh is low. The second curve 230 shows an amount of the compute load that is time sensitive load. This amount of the load may not be time shifted and may need to be performed at that time.

A third curve 240 represents a virtual capacity for cell A 150A. As shown, the virtual capacity is high when $gCO2$/kWh is high and is low when $gCO2$/kWh is low. At any point in time, the virtual capacity is also higher than the second curve 230 so that sufficient computational capacity is available for time sensitive loads.

The fourth curve 250 shows a load for cell A 150A shaped by virtual capacity. The compute load shaped by virtual capacity is also high when $gCO2$/kWh is high and is low when $gCO2$/kWh is low, and at any point in time is lower than the virtual capacity. Accordingly, by shaping compute load with virtual capacity during a day, less emissions of carbon dioxide may be needed for the same total amount of computations performed during the day.

FIG. 2A shows how in the early morning, the cell performs some of the previous day's compute load that was delayed from the prior day, in the late morning some of the compute load that would have been computed for the cell is instead delayed until the late afternoon, and in the early afternoon some of the compute load is delayed for computation by the cell until the next day.

Figure 2B:
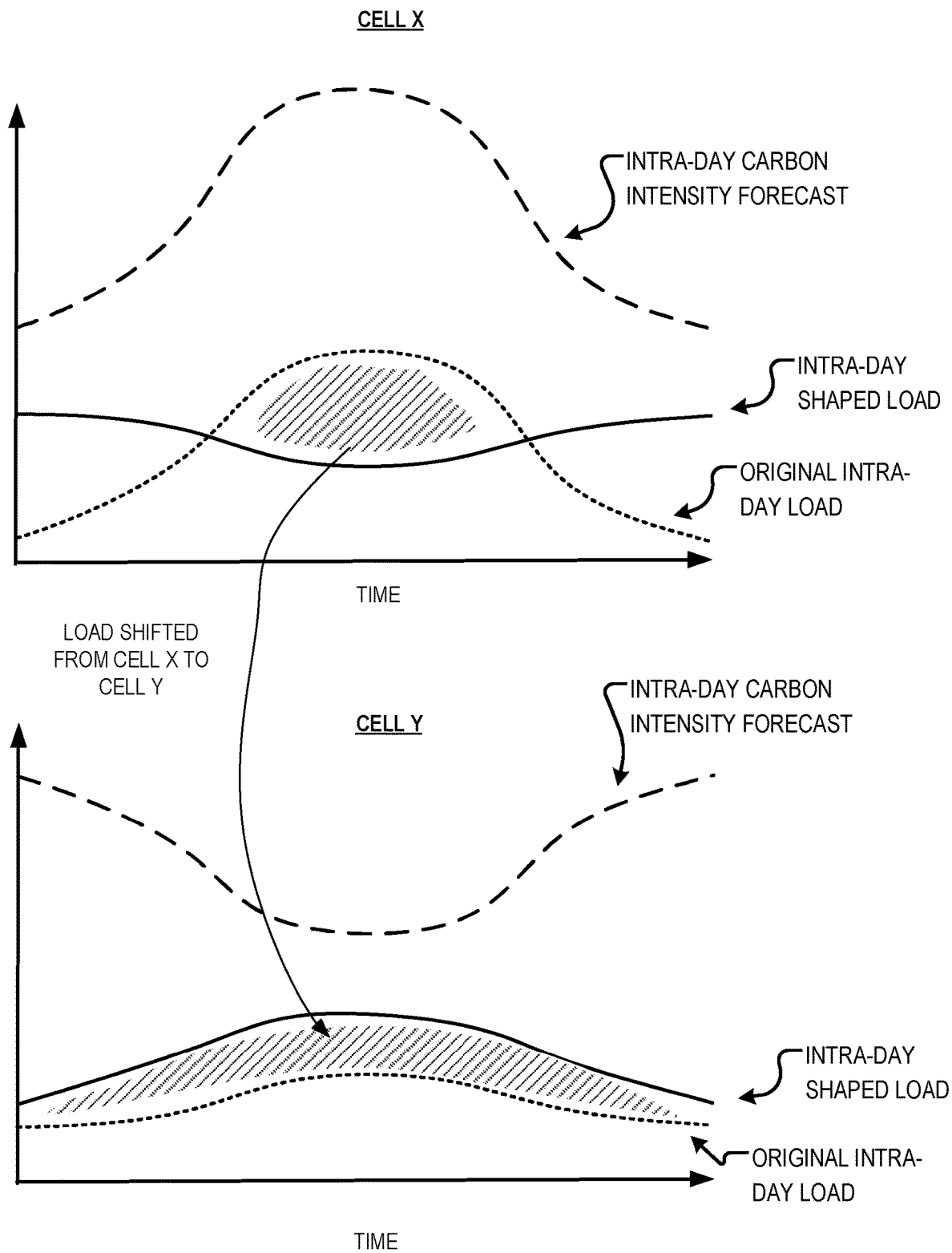
FIG. 2B is an example graph that shows spatially moving compute load.

FIG. 2B is an example graph that shows spatially moving compute load. As shown in the graph, Cells X and Y have different intra-day carbon intensity forecasts. Cell X has an intra-day carbon forecast that peaks around the middle of the X-axis of the graph, and Cell Y has an intra-day carbon forecast that bottoms around the middle of the X-axis. For example, the middle of the X-axis may be noon where Cell X is located and midnight where Cell Y is located. Accordingly, compute load for Cell X that would computed around noon where Cell X is located may be time shifted by location to be computed by Cell Y, reducing the amount of carbon generated to perform the computation.

Figure 3:
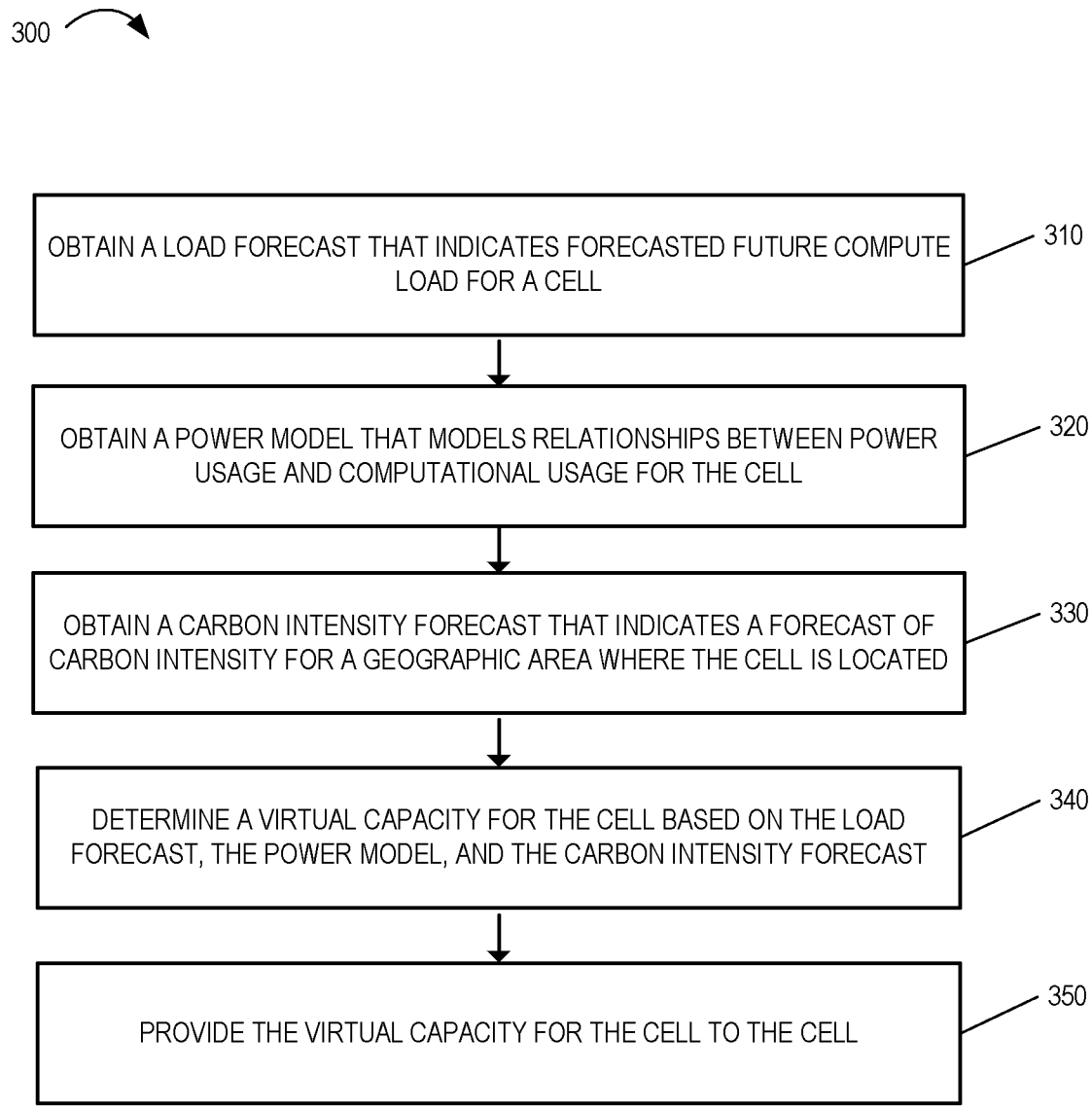
FIG. 3 is a flow diagram that illustrates an example of a process for shaping compute load using virtual capacity.

FIG. 3 is a flow diagram that illustrates an example of a process 300 for shaping compute load using virtual capacity. For example, the process 300 may be used by the system 100 shown in FIG. 1 or some other system. While operations are depicted in FIG. 3 in a particular order, this should not be understood as requiring that such operations be performed in the particular order shown or in sequential order, or that all illustrated operations be performed, to achieve desirable results. In certain circumstances, multitasking and parallel processing may be advantageous.

The process 300 includes obtaining a load forecast that indicates forecasted future compute load for a cell (310). For example, the virtual capacity engine 140 may receive a load forecast for cell A 150A. In another example, the virtual capacity engine 140 may receive a load forecast for cell B 150B.

The process 300 includes obtaining a power model that models a relationship between power usage and computational usage for the cell (320). For example, the virtual capacity engine 140 may receive a power model for cell A 150A. In another example, the virtual capacity engine 140 may receive a power model for cell B 150B.

In some implementations, obtaining a power model that models a relationship between power usage and computational usage for the cell includes training the model based on historical power usage of a cell and historical computational capacity of the cell that is used. For example, the virtual capacity engine 140 may monitor power usage of cell A 150A during the past week and computational capacity of cell A 150A that is used during the past week, and train a model based on the power usage of cell A 150A during the past week and the computational capacity of cell A 150A that is used during the past week.

The process 300 includes obtaining a carbon intensity forecast that indicates a forecast of carbon intensity for a geographic area where the cell is located (330). For example, the virtual capacity engine 140 may receive the carbon intensity forecast for Europe where cell A 150A is located. In another example, the virtual capacity engine 140 may receive, from a third party provider, the carbon intensity forecast for Asia where cell B 150B is located. In yet another example, the virtual capacity engine 140 may obtain the carbon intensity forecast by generating the carbon intensity forecast for Europe where cell A 150A is located. In still another example, the virtual capacity engine 140 may obtain, from one or more third party providers, carbon intensity forecasts for each geographic area that cells are located.

The process 300 includes determining a virtual capacity for the cell based on the load forecast, the power model, and the carbon intensity forecast (340). For example, the virtual capacity engine 140 may determine the virtual capacity for cell A 150A based on the load forecast for cell A 150A, the power model for cell A 150A, and the carbon intensity forecast for Europe where cell A 150A is located.

In some implementations, the virtual capacity indicates a maximum computational capacity for the cell for pre-determined time intervals. For example, the virtual capacity for cell A 150A may be represented by the curve 240 labeled virtual capacity for cell A 150A in FIG. 2A, which indicates a constant maximum capacity for one hour intervals during a twenty four hour period. In another example, the virtual capacity may indicate maximum capacity for twenty minute intervals during a twelve hour period.

In some implementations, determining a virtual capacity for the cell based on the load forecast, the power model, and the carbon intensity forecast includes determining, based on the load forecast, the power model, and the carbon intensity forecast, the virtual capacity such that the virtual capacity reduces load peaks in the cell and reduces carbon footprint from power usage by the cell. For example, the virtual capacity engine 140 may use a cost function that increases costs for higher load peaks and reduces cost for lower carbon footprint.

In some implementations, obtaining a load forecast that indicates forecasted future compute load for a cell includes determining a portion of the load forecast that is not time flexible, where determining the virtual capacity for the cell includes determining the virtual capacity to be greater than the portion of the load forecast that is not time flexible. For example, the virtual capacity engine 140 may determine that half of forecasted load for each hour is not time flexible and, in response, determine the virtual capacity for each hour for the cell to be at least half of the forecasted load for that hour.

In some implementations, determining a virtual capacity for the cell based on the load forecast, the power model, and the carbon intensity forecast includes obtaining respective load forecasts that indicate forecasted future compute loads for respective multiple other cells, obtaining respective power models that model relationships between power usage and computational usage for the respective other cells, obtaining respective carbon intensity forecasts that indicate forecasts of carbon intensity for geographic areas where the respective other cells are located, and determining both the virtual capacity for the cell and respective virtual capacities for the other cells based on the load forecast, the power model, the carbon intensity forecast, the respective load forecasts, the respective power models, and the respective carbon intensity forecasts. For example, the virtual capacity engine 140 may determine that it would be better to have higher resource usage at a first cell over a second cell at a particular time, and, in response, increase the virtual capacity for the first cell at the particular time and decrease the virtual capacity for the second cell at the particular time.

In some implementations, the process 300 includes receiving an indication of a total amount of spatially and temporally flexible demand, where determining both the virtual capacity for the cell and respective virtual capacities for the other cells is further based on the total amount of spatially and temporally flexible demand. For example, the virtual capacity engine 140 may receive an indication of an amount of demand for the next day that is flexible in the location where the demand is satisfied, and, in response, have more of the demand be performed by a cell in a location that has a lower carbon intensity forecast by increasing the virtual capacity for that cell, and have less of the demand be performed by another cell in another location that has a higher carbon forecast intensity forecast by decreasing the virtual capacity for that cell.

The process 300 includes providing the virtual capacity for the cell to the cell (350). For example, the virtual capacity engine 140 may provide the virtual capacity 160A to cell A 150A. In another example, the virtual capacity engine 140 may provide the virtual capacity 160B to cell B 150B.

In some implementations, the cell is configured to perform operations of receiving a job, determining an amount of computational resources needed to execute the job, determining that a difference between the virtual capacity for the cell and a current computational usage of the cell satisfies the amount of computational resources needed to execute the job, and executing the job. For example, the cell 150A may receive a job, determine that the job needs two CPU cores, that a virtual capacity for the cell 150A for the current hour is fifty five CPU cores, that capacity of the cell that is currently being used by the cell 150A is fifty CPU cores, determine that the difference of five CPU cores between the virtual capacity of fifty five CPU cores and the capacity that is currently being used of fifty CPU cores satisfies the amount needed of two CPU cores, and, in response, executes the job.

In some implementations, the cell is configured to perform operations of receiving a job, determining an amount of computational resources needed to execute the job, determining that a difference between the virtual capacity for the cell and a current computational usage of the cell does not satisfy the amount of computational resources needed to execute the job, and deferring execution of the job. For example, the cell 150A may receive a job, determine that the job needs eight CPU cores, that a virtual capacity for the cell 150A for the current hour is fifty five CPU cores, that capacity of the cell that is currently being used by the cell 150A is fifty CPU cores, determine that the difference of five CPU cores between the virtual capacity of fifty five CPU cores and the capacity that is currently being used of fifty CPU cores does not satisfy the amount needed of eight CPU cores, and, in response, queues the job into a queue of jobs.

Figure 4:
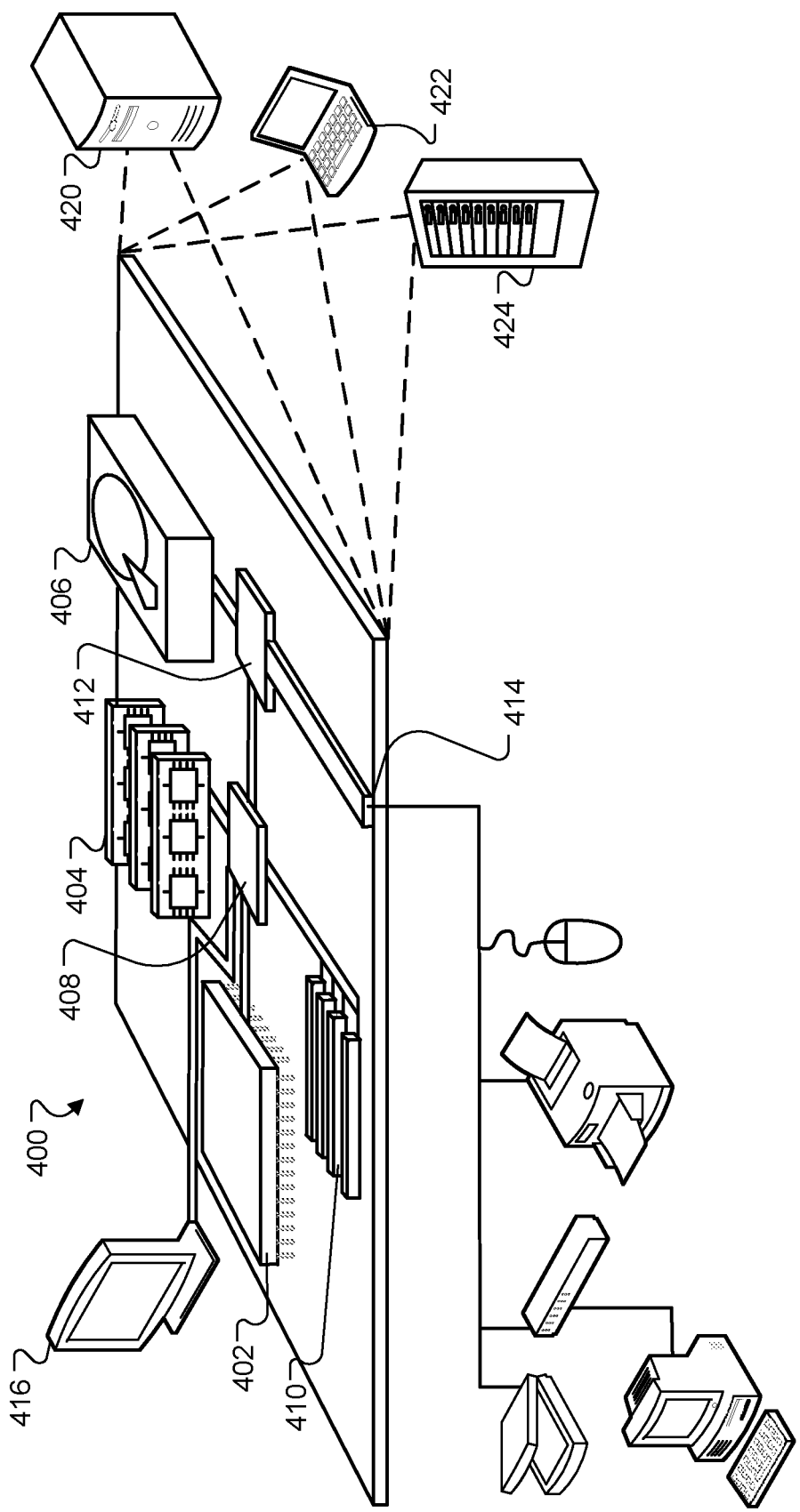
FIG. 4 is a diagram of examples of computing devices.

FIG. 4 shows an example of a computing device 400 that can be used to implement the techniques described here. The computing device 400 is intended to represent various forms of digital computers, such as laptops, desktops, workstations, personal digital assistants, servers, blade servers, mainframes, and other appropriate computers.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown). Each of such devices may contain one or more of the computing device 400, and an entire system may be made up of multiple computing devices communicating with each other.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   for each cell of a plurality of cells, each cell of the plurality of cells being at different respective geographic locations:
      obtaining a load forecast for a future period of time that indicates forecasted future compute load for the cell during respective intervals of the future period of time;
      obtaining a power model that models a relationship between power usage and computational usage for the cell; and
      obtaining a carbon intensity forecast that indicates a forecast of carbon intensity for the geographic area where the cell is located for the respective intervals of the future period of time;
   determining, from a first carbon intensity forecast for a first cell of the plurality of cells and a second carbon intensity forecast for a second cell of the plurality of cells, that the carbon intensity for one or more time intervals for the first geographic area where the first cell is located is less than the carbon intensity for one or more time intervals for the second geographic area where the second cell is located; and
   in response to the determination, shifting a compute load from the second cell to the first cell during at least one of the one or more time intervals.

2. The method of claim 1, wherein determining that the carbon intensity for one or more time intervals for the first geographic area where the first cell is located is less than the carbon intensity for one or more time intervals for the second geographic area where the second cell is located comprises determining that the carbon intensity for one or more time intervals for the first geographic area where the first cell is located is less than the carbon intensity for the same one or more time intervals for the second geographic area where the second cell is located.

3. The method of claim 2, wherein shifting the compute load from the second cell to the first cell during at least one of the one or more time intervals comprises shifting the compute load from the second cell to the first cell during each of the one of the one or more time intervals.

4. The method of claim 1, wherein determining that the carbon intensity for one or more time intervals for the first geographic area where the first cell is located is less than the carbon intensity for one or more time intervals for the second geographic area where the second cell is located comprises determining that the carbon intensity for a plurality of time intervals for the first geographic area where the first cell is located is less than the carbon intensity for a single time interval for the second geographic area where the second cell is located.

5. The method of claim 4, wherein shifting the compute load from the second cell to the first cell during at least one of the one or more time intervals comprises shifting the compute load from the second cell to the first cell during the single time interval for the second geographic location.

6. The method of claim 4, wherein shifting the compute load from the second cell to the first cell during at least one of the one or more time intervals comprises shifting the compute load from the second cell to the first cell during any of the plurality of time intervals for the first location.

7. A system comprising:
   one or more computers and one or more storage devices storing instructions that are operable, when executed by the one or more computers, to cause the one or more computers to perform operations comprising:

for each cell of a plurality of cells, each cell of the plurality of cells being at different respective geographic locations:
    obtaining a load forecast for a future period of time that indicates forecasted future compute load for the cell during respective intervals of the future period of time;
    obtaining a power model that models a relationship between power usage and computational usage for the cell; and
    obtaining a carbon intensity forecast that indicates a forecast of carbon intensity for the geographic area where the cell is located for the respective intervals of the future period of time;
determining, from a first carbon intensity forecast for a first cell of the plurality of cells and a second carbon intensity forecast for a second cell of the plurality of cells, that the carbon intensity for one or more time intervals for the first geographic area where the first cell is located is less than the carbon intensity for one or more time intervals for the second geographic area where the second cell is located; and
in response to the determination, shifting a compute load from the second cell to the first cell during at least one of the one or more time intervals.

8. The system of claim 7, wherein determining that the carbon intensity for one or more time intervals for the first geographic area where the first cell is located is less than the carbon intensity for one or more time intervals for the second geographic area where the second cell is located comprises determining that the carbon intensity for one or more time intervals for the first geographic area where the first cell is located is less than the carbon intensity for the same one or more time intervals for the second geographic area where the second cell is located.

9. The system of claim 8, wherein shifting the compute load from the second cell to the first cell during at least one of the one or more time intervals comprises shifting the compute load from the second cell to the first cell during each of the one of the one or more time intervals.

10. The system of claim 7, wherein determining that the carbon intensity for one or more time intervals for the first geographic area where the first cell is located is less than the carbon intensity for one or more time intervals for the second geographic area where the second cell is located comprises determining that the carbon intensity for a plurality of time intervals for the first geographic area where the first cell is located is less than the carbon intensity for a single time interval for the second geographic area where the second cell is located.

11. The system of claim 10, wherein shifting the compute load from the second cell to the first cell during at least one of the one or more time intervals comprises shifting the compute load from the second cell to the first cell during the single time interval for the second geographic location.

12. The system of claim 10, wherein shifting the compute load from the second cell to the first cell during at least one of the one or more time intervals comprises shifting the compute load from the second cell to the first cell during any of the plurality of time intervals for the first location.

13. A non-transitory computer-readable medium storing software comprising instructions executable by one or more computers which, upon such execution, cause the one or more computers to perform operations comprising:
for each cell of a plurality of cells, each cell of the plurality of cells being at different respective geographic locations:
    obtaining a load forecast for a future period of time that indicates forecasted future compute load for the cell during respective intervals of the future period of time;
    obtaining a power model that models a relationship between power usage and computational usage for the cell; and
    obtaining a carbon intensity forecast that indicates a forecast of carbon intensity for the geographic area where the cell is located for the respective intervals of the future period of time;
determining, from a first carbon intensity forecast for a first cell of the plurality of cells and a second carbon intensity forecast for a second cell of the plurality of cells, that the carbon intensity for one or more time intervals for the first geographic area where the first cell is located is less than the carbon intensity for one or more time intervals for the second geographic area where the second cell is located; and
in response to the determination, shifting a compute load from the second cell to the first cell during at least one of the one or more time intervals.

* * * * *